Patented May 17, 1932

1,858,625

UNITED STATES PATENT OFFICE

ERWIN HOFFA, OF HOCHST-ON-THE-MAIN, GERMANY, ASSIGNOR TO GENERAL ANILINE WORKS, INC., OF NEW YORK, N. Y., A CORPORATION OF DELAWARE

3.5-DIHALOGEN-1-METHYL-BENZENE-2-CARBOXYLIC ACIDS AND PROCESS OF PREPARING THE SAME

No Drawing. Application filed October 13, 1927, Serial No. 226,038, and in Germany October 23, 1926.

My present invention relates to the preparation of 4-methyl-6-halogen-thioindigo dyestuffs and an intermediate product thereof.

Various processes have already been disclosed by which it is possible to obtain 4.6-substituted hydroxythionaphthenes and thioindigo dyestuffs respectively, particularly the commercially valuable 4-methyl-6-halogen-hydroxythionaphthenes and oxidation or condensation products thereof. These processes are distinguished from each other by the kind of starting material used for the reaction and consequently by the different steps of the process. All of the hitherto known processes can only be carried out in numerous intermediate stages which sometimes involve technical difficulties. The preparation of the said 4-methyl-6-chlorhydroxy-thionaphthene could be realized if a process would be known by which it is possible to obtain the 3.5-dichloro-1-methyl-benzene-2-carboxylic acid, because this acid like other o-halogenbenzoic acids can be converted by one of the known methods for instance by way of the mercaptocarboxylic acid into the corresponding hydroxythionaphthene as described in German Patent No. 189,200.

Now I have found that the said 3.5-dichloro-1-methylbenzene-2-carboxylic acid can be easily obtained, and thus a simple way opened up for producing the 4-methyl-6-chlorhydroxy-thionaphthene, by starting from the 3.5-dichlor-2-amino-1-methylbenzene, a compound which is left as a waste-product or by-product in certain manufacturing-processes and which has hitherto not been used on a large scale for technical purposes.

The 3.5-dichloro-2-amino-1-methylbenzene is transformed according to the method proposed by Sandmeyer into the 3.5-dichloro-2-cyano-1-methylbenzene, and the latter by hydrolysis into the 3.5-dichloro-1-methylbenzene-2-carboxylic acid. Now, when proceeding in the manner described in German Patent No. 189,200 the 4-methyl-6-chlorhydroxy-thionaphthene could for instance be prepared in the following way:

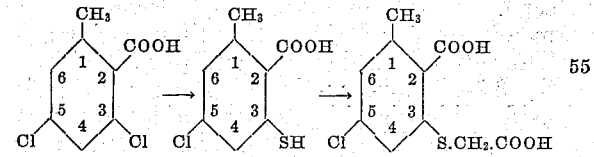

The transformation of the hydroxythionaphthene into the thioindigo dyestuffs can also be operated by one of the already known methods.

It could not be foreseen that the various above indicated stages of the reaction would take an easy course, because in the starting materials to be used the amino-group is di-ortho-substituted and even a mono-ortho-substitution, and in a still greater measure a di-ortho-substitution impedes a reaction, and further because the saponificaton of such a substituted nitrile generally requires drastic operations which render the destruction of the molecule very probable. However, in my new process the exchange of the amino group for the cyanogen has proved to occur very easily, and the hydrolysis of the nitrile may be effected by a prolonged heating with sulfuric acid of a determined concentration.

The advantage of my new process, therefore, resides in the fact that a hitherto worth-less starting material (waste-product) can be utilized in a useful manner and secondly that the valuable, already known dyestuff in question is obtained in a way which leads over intermediate manufacturing stages which can be easily conducted.

The following example serves to illustrate my invention but it is not intended to limit it thereto, all parts being parts by weight:

178 parts of 3.5-dichloro-2-amino-1-methylbenzene are dissolved hot in 440 parts of concentrated hydrocholric acid and 800 parts of water and then cooled to 0° C. to 10° C. This mixture is diazotized at the said temperature with a concentrated aqueous solution of 69 parts of sodium nitrite. The resulting diazo solution is introduced at ordinary temperature, while stirring, into a solution of 89 parts of cuprous cyanide and 135 parts of potassium cyanide in 800 parts of water, and there is simultaneously run in an aqueous solution of sodium carbonate the quantity of which is to be so chosen that the mass remains constantly weakly alkaline towards turmeric-paper. The precipitate which has formed is filterd off by suction and the 3.5-dichloro-2-cyano-1-methylbenzene is expelled therefrom by distillation with steam. It distills over as an oil which soon solidifies and is in a sufficiently pure state for being further worked up.

188 parts of 3.5-dichlor-2-cyano-1-methylbenzene are boiled in a reflux apparatus for 24 hours, while stirring, with 300 parts of sulfuric acid of 65% strength. The product of the reaction is diluted with water to 10000 parts by volume and the product which has separated is filtered off. It is extracted by means of a solution of sodium carbonate. The residue—which substantially constitutes the 3.5-dichlor-1-methylbenzene-2-carboxylic acid amide—is added to a second hydrolyzing operation. The extract thus obtained is acidified by means of hydrochloric acid.

The 3.5-dichlor-1-methylbenzene-2-carboxylic acid thereby precipitated is in a sufficiently pure state for being further worked up. The transformation of this acid into the hydroxythionaphthene and of the latter into the thioindigo dyestuff can be effected by one of the known methods.

The 3.5-dichlor-1-methylbenzene-2-carboxylic acid which is obtainable by the new process and has the formula:

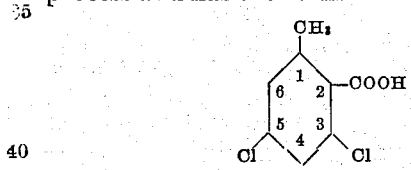

is very readily soluble in alcohol, glacial acetic acid and chloroform, readily soluble in benzol, difficultly soluble in benzine and water. Recrystallized from water it melts at 154° C. to 155° C.

This acid dissolves in alkalies, sodium carbonate and sodium acetate with formation of readily-soluble alkali metal salts. The lead and silver salts derived therefrom are difficulty soluble.

As a derivative of the dichlortoluic acid the amide of the formula:

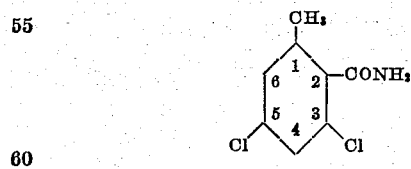

has been prepared, which, when redissolved from water, melts at 167° to 169° C.

I claim:

1. In the process of perparing 4-methyl-6-halogen-thioindigo dyestuffs the steps of diazotizing the 3.5-dihalogen-2-amino-1-methylbenzene of the following formula:

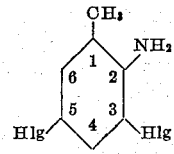

converting this compound into the 2-nitrile and transforming the latter by means of a hydrolyzing agent into the 3.5-dihalogen-1-methylbenzene-2-carboxylic acid.

2. In the process of preparing 4-methyl-6-chlor-thioindigo dyestuffs the steps of diazotizing the 3.5-dichlor-2-amino-1-methylbenzene of the following formula:

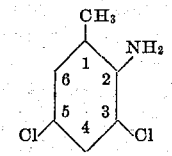

converting this compound into the 2-nitrile and transforming the latter by means of boiling sulfuric acid of 65% strength into the 3.5-dichloro-1-methylbenzene-2-carboxylic acid.

3. As new product, 3.5-dichlor-1-methylbenzene-2-carboxylic acid of the following formula:

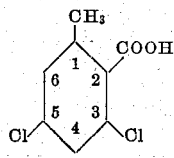

being readily soluble in alkalies, sodium carbonate, sodium acetate, alcohol, glacial acetic acid, chloroform, benzol, difficultly soluble in benzine or water; having, after being recrystallized from water, a melting point of 154° C. to 155° C. and forming an acid amide which melts at 167° to 169° C.

In testimony whereof, I affix my signature.

ERWIN HOFFA.